United States Patent
Mañá

(10) Patent No.: US 9,710,547 B2
(45) Date of Patent: Jul. 18, 2017

(54) NATURAL LANGUAGE SEMANTIC SEARCH SYSTEM AND METHOD USING WEIGHTED GLOBAL SEMANTIC REPRESENTATIONS

(71) Applicant: Inbenta Professional Services, S.L., Barcelona (ES)

(72) Inventor: Jordi Torras Mañá, Barcelona (ES)

(73) Assignee: Inbenta, Barcelona (ES)

( * ) Notice: Subject to any disclaimer, the term of this patent is extended or adjusted under 35 U.S.C. 154(b) by 243 days.

(21) Appl. No.: 14/550,082

(22) Filed: Nov. 21, 2014

(65) Prior Publication Data

US 2016/0147878 A1    May 26, 2016

(51) Int. Cl.
*G06F 17/30* (2006.01)

(52) U.S. Cl.
CPC .............................. *G06F 17/30684* (2013.01)

(58) Field of Classification Search
None
See application file for complete search history.

(56) References Cited

U.S. PATENT DOCUMENTS

| | | | |
|---|---|---|---|
| 6,076,051 A | 6/2000 | Messerly | |
| 8,984,098 B1* | 3/2015 | Tomkins | G06F 17/30041 709/219 |
| 9,092,802 B1* | 7/2015 | Akella | G06Q 30/0256 |
| 9,355,352 B1* | 5/2016 | Paiz | G06Q 30/0635 |
| 2005/0144162 A1* | 6/2005 | Liang | G06F 17/30109 |
| 2005/0154723 A1* | 7/2005 | Liang | G06F 17/30109 |
| 2006/0026113 A1* | 2/2006 | Omoigui | G06F 17/30864 706/55 |
| 2007/0043687 A1 | 2/2007 | Bodart | |
| 2008/0147716 A1* | 6/2008 | Omoigui | G06F 17/30864 |
| 2009/0030800 A1 | 1/2009 | Grois | |
| 2010/0070448 A1* | 3/2010 | Omoigui | H01L 27/1463 706/47 |

(Continued)

FOREIGN PATENT DOCUMENTS

EP    2 400 400 A1    6/2011

OTHER PUBLICATIONS

Bollegala, Danushka, Yutaka Matsuo, and Mitsuru Ishizuka. "Measuring semantic similarity between words using web search engines." www 7 (2007): 757-766.*

(Continued)

*Primary Examiner* — Farhan Syed
(74) *Attorney, Agent, or Firm* — Dilworth Paxson LLP; Edward F. Behm, Jr.

(57) ABSTRACT

Semantic Search Engine using Lexical Functions and Meaning-Text Criteria, that outputs a response (R) as the result of a semantic matching process consisting in comparing a natural language query (Q) with a plurality of contents (C), formed of phrases or expressions obtained from a contents' database (6), and selecting the response (R) as being the contents corresponding to the comparison having a best semantic matching degree. It involves the transformation of the contents (C) and the query in individual words or groups of tokenized words (W1, W2), which are transformed in its turn into semantic representations (LSC1, LSC2) thereof, by applying the rules of Meaning Text Theory and through Lexical Functions, the said semantic representations (LSC1, LSC2) consisting each of a couple formed of a lemma (L) plus a semantic category (SC).

15 Claims, 2 Drawing Sheets

(56) References Cited

U.S. PATENT DOCUMENTS

2012/0191716 A1* 7/2012 Omoigui ............ H01L 27/1463
707/740
2014/0075004 A1* 3/2014 Van Dusen ............ H04L 41/04
709/223

OTHER PUBLICATIONS

Lee, Gary Geunbae, Jungyun Seo, Seungwoo Lee, Hanmin Jung, Bong-Hyun Cho, Changki Lee, Byung-Kwan Kwak et al. "SiteQ: Engineering High Performance QA System Using Lexico-Semantic Pattern Matching and Shallow NLP." In TREC. 2001, pp. 1-10 (10 total pages).*

Mangold, Christoph. "A survey and classification of semantic search approaches." International Journal of Metadata, Semantics and Ontologies 2, No. 1 (2007): 23-34. (12 total pages).*

* cited by examiner

NATURAL LANGUAGE SEMANTIC SEARCH SYSTEM AND METHOD USING WEIGHTED GLOBAL SEMANTIC REPRESENTATIONS

OBJECT OF THE INVENTION

The field of the present invention is that of Computational Linguistics.

The present invention relates to as semantic search engine module for a question-answering system that outputs response(s) as the result of a matching process consisting in comparing a query with a plurality of contents, formed of phrases or expressions obtained from a contents' database, and selecting the response as being the contents corresponding to the comparison having a best semantic matching degree.

More particularly, the present invention is aimed to a semantic search engine using so-called "Lexical Functions" relations, Meaning-Text Criteria (i.e. Meaning-Text Theory), and automatic entropy calculation to implement a search engine that matches user queries with content based in meaning instead of keywords (as it is performed in the conventional search engines).

BACKGROUND OF THE INVENTION

State-of-the-Art

Search engines, as part of question-answering systems, use automated software programs so-called "spiders" to survey documents and build their databases. Documents are retrieved by these programs and analyzed. Data collected from each document are then added to the search engine index. When a user query is entered at a search engine site, the input is checked against the search engine's index of all documents it has analyzed. The best documents are then returned as hits, ranked in order with the best results at the top.

In information theory, "entropy" is a measure of the uncertainty in a variable. In this context, the term "entropy" usually refers to the Shannon Entropy, which quantifies the expected value of the information contained in a message.

There are two primary methods of text searching: keyword search and natural language search.

Keyword searching is the most common way of text search. Most search engines do their text query and retrieval using keywords. This method achieves a very fast search, even with large amounts of data behind to search for and a fully automatic and autonomous indexing is made possible. But the fact that the search is based on forms (strings of characters) and not concepts or linguistic structures limits the effectiveness of the searches. One of the problems with keyword searching, for instance, is that it is difficult to specify the field or the subject of the search because the context of searched keywords is not taken into account. Ex. they have a drawback in distinguishing between polysemous words (i.e. words that are spelled the same way, but have a different meaning).

Most keyword search engines cannot return hits on keywords that mean the same, but are not actually entered in the user's query. A query on heart disease, for instance, would not return a document that used the word "cardiac" instead of "heart". Some search engines based on keywords use thesaurus or other linguistic resources to expand the number of forms to be searched, but the fact that this expansion is made keyword by keyword expansion, regardless of the context, causes combinations of keywords that completely change the original intention of the query. For example, from 'Heart+disease' the user could reach 'core+virus' and completely miss the topic of the search and get unrelated results.

Some search engines also have trouble with so-called stemming. For example, if you enter the word "fun," should the system return a hit on the word, "fund"? What about singular and plural words? What about verb tenses that differ from the word you entered by only an "s," or an "ed"?

Unlike keyword search systems, natural language-based search systems try to determine what you mean, not just what you say, by means of natural language processing. Both queries and document data are transformed into a predetermined linguistic (syntactic or semantic) structure. The resulting matching goes beyond finding similar shapes, and aims at finding similar core meanings.

These search engines transform samples of human language into more formal representations (usually as parse trees or first-order logic structures). To achieve this, many different resources that contain the required linguistic knowledge (lexical, morphological, syntactic, semantic . . . ) are used. The nerve centre is usually a grammar (context-free, unrestricted, context sensitive, semantic grammar, . . . ) which contains linguistic rules to create formal representations together with the knowledge found in the other resources.

Most natural language based search engines do their text query and retrieval by using syntactic representations and their subsequent semantic interpretation. The intention to embrace all aspects of a language, and being able to syntactically represent the whole set of structures of a language using different types of linguistic knowledge makes this type of systems extremely complex and expensive. Other search systems choose to simplify this process, for example, by dismissing syntactic structure as the central part of the formal representation of the query. These streamlined processes are usually more effective especially when indexing large amounts of data from documents, but since these systems synthesize less information than a full natural language processing system, they also require refined matching algorithms to fill the resulting gap.

To summarize, it is to be said that up to this moment, most of the existing Natural Language searching software bases its analysis on the retrieval of "keywords", the syntactic structure of the phrases and the formal distribution of words in a phrase, to the detriment of semantics, something which does not allow meaning recognition.

The document EP2400400A1 can be cited as the closest prior art. In this publication, a Semantic Search Engine is described using Lexical Functions and Meaning-Text Criteria, that outputs a response (R) as the result of a semantic matching process consisting in comparing a natural language query (Q) with a plurality of contents (C), formed of phrases or expressions obtained from a contents' database (6), and selecting the response (R) as being the contents corresponding to the comparison having a best semantic matching degree. It involves the transformation of the contents (C) and the query in individual words or groups of tokenized words (W1, W2), which are transformed in its turn into semantic representations (LSC1, LSC2) thereof, by applying the rules of Meaning Text Theory and through Lexical Functions, the said semantic representations (LSC1, LSC2) consisting each of a couple formed of a lemma (L) plus a semantic category (SC).

Whilst the search engine of EP2400400 provides a tool for an easy and effective recognition when it comes to retrieve actual and meaningful information when performing searching work, still in some instances, yet very seldom, it is very difficult, to distinguish what is semantically important or distinctive Within the text from what isn't, given a particular context.

It is here to be stressed that the present invention eases an automatic entropy calculation and hence, the likelihood of a meaning being ascertained.

EXPLANATION OF THE INVENTION

To such a goal, the object invention provides a new semantic search engine according to the characterizing part of claim 1.

In claims 2 to 15, different preferred features of the invention are disclosed.

In summary, the present invention provides for a meaning-based search engine for the enterprise that detects and compares query and database knowledge meanings and calculates their semantic coincidence. In short, the present invention uses a formal representation for queries (input) and content indexation based on meanings. The process of detecting, transforming, expanding and contracting meanings is carried out following the rules of the Meaning-Text theory, through lexicon and Lexical Functions assignments and rules database.

The calculation of the degree of overlap between the meaning of a query and the meanings of the indexed contents is done through a so called "Scored Coincidence algorithm", that takes several semantic and statistic factors into account to calculate such a degree.

As it is said earlier in the present document, when it comes to entropy calculation, frequency is key. Indeed, information uses Claude E Shannon's Information Theory to compute which linguistic symbols contain more information, based on the context of a particular content data. The main concepts of information theory can be grasped by considering the most widespread means of human communication: language. Two important aspects of a concise language are as follows:

First, the most common words (e.g., "a", "the", "I") should be shorter than less common words (e.g., "benefit", "generation", "mediocre"), on that sentences will not be too long. Such a tradeoff in word length is analogous to data compression and is the essential aspect of source coding.

Second, if part of a sentence is unheard or misheard due to noise—or a typo on a computer keyword—the listener (or reader) should still be able to glean the meaning of the underlying message. Such robustness is as essential for an electronic communication system as it is for a language; properly building such robustness into communications is done by channel coding. Source coding and channel coding are the fundamental concerns of information theory.

The amount of information that can be obtained about one random variable X by observing another Y. It is important in communication where it can be used to maximize the amount of information shared between sent and received signals. The mutual Information of relative to is given by the formula:

$$I(X;Y) = \mathbb{E}_{x,y}[SI(x,y)] = \sum_{x,y} p(x,y) \log \frac{p(x,y)}{p(x)p(y)}$$

The basic conclusion of this formulation is that Information decreases as probability of a symbol increases, based on a logarithmic proportion. When "log" is taken in base 2, the information is measured in bits.

The present invention takes this formula considering "probabilty" based on the statistic frequency of elements (linguistic symbols) that are found in a particular collections of documents, that define the context of the search experience.

As we will see later in this document, the present invention also uses a concept of "semantic frequency", that takes into account the frequency of symbols found in the context, but also those semantically related symbols that, even though they are not found literally in the contents, they must considered in terms of variation of Information.

As those skilled in the art will appreciate, the present invention dismisses the syntactic structure as the central part of the system on behalf of the semantic representation of the query extracted through rules based on Lexical Functions assignments where each semantic element has been context balanced by an automatic entropy calculation.

As far as the invention uses an objective Lexical Functions assignments and rules database per language and a statistical system that automatically adjusts the objective weighting of the meanings to each context and project, the semantic search engine provides question-answering systems (of any magnitude) with quality scored matching responses with no need of previous particular linguistic analysis or any other precalculated databases.

BRIEF DESCRIPTION OF THE DRAWINGS

A detailed description of preferred, although not exclusive, embodiments of the semantic search engine that is the object of the invention is provided below, accompanied by drawings for the better understanding thereof, wherein embodiments of the present invention are illustrated by way of non-limiting example. In said drawings.

DETAILED DESCRIPTION OF THE INVENTION

The elements designated with numeral references correspond to the parts explained hereinafter.

Figure 1:
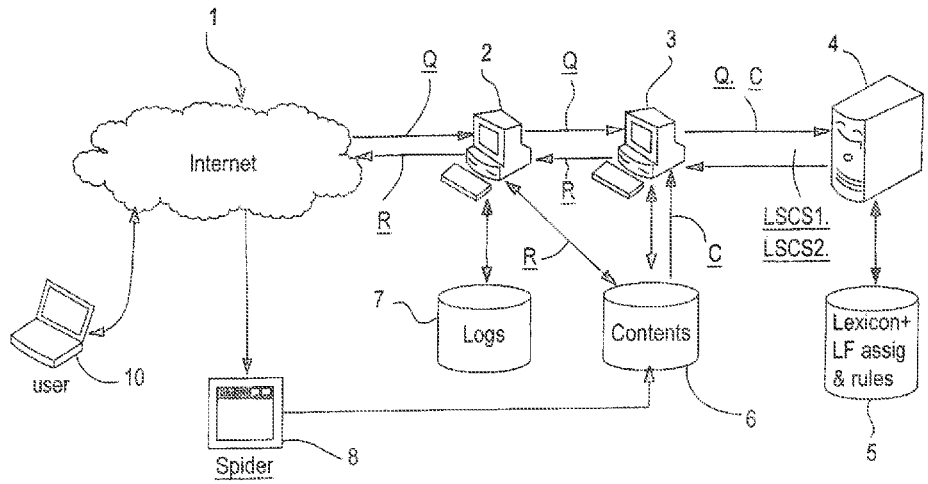
FIG. 1 is a diagrammatical view showing the architecture of the system implementing the search engine of the present invention.

In FIG. 1 a technical architecture diagram of the search engine of the present invention can be seen, wherein a user 10 is connected to Internet 1 to achieve a response or result R to a natural language query Q, which is passed to first computer means 2 connected to second computer means 3, which communicates with a lexical server 4. The first computer 2 has a logs' database 7, which stores all the activity on the system, and is connected to an updatable contents' database 6, which in turn is accessible by the second computer means 3.

Second computer means 3 passes the query Q to the lexical server 4, which converts queries in natural language into semantic representations (LSC1) that combined as a sequence give a global semantic representation (LSCS1) of its meaning, by means of the rules of the Meaning-Text theory (MTT) and through lexicon and Lexical Functions assignments and rules (LSCLF), i.e. in sequences of pairs of lemmas L and semantic categories SC (sequences of LSC1 becoming a global semantic representation for all the query Q (LSCS1)), that are fed back to the second computer means 3, as it will be discussed shortly hereafter.

Database 6 contains categorized formal responses (which will work as visible outputs) and all their "content knowledge" (which is used to match input with the contents). In the same manner as query Q is converted, second computer means 3 passes every contents C to the lexical server 4, which likewise converts contents in natural language into semantic representations (LSC2) that combined as a sequence give a global semantic representation (LSCS2) of its meaning, by means of the rules of the Meaning-Text theory (MT) and through lexicon and Lexical Functions assignments and rules (LSCLF), i.e. in sequences of pairs of lemmas L and semantic categories SC (sequences of LSC2 becoming a global semantic representation for all the contents C (LSCS2)) that are also fed back to the second computer means 3.

Second computer means 3 has a program that adds a balanced semantic weight to the semantic representations (LSC1 and LSC2), provided by the lexical server 4, becoming balanced weighted semantic representations (LSC1+FSW1 and LSC2+FSW2) that combined as a sequence give a global weighted semantic representation (LSCS1+FSWS1 and LSC2S+FSWS2). The assignment of balanced semantic weight to the semantic representations of the contents in the contents' database 6 is precalculated by second computer means 3 and indexed into database 6. So the contents of the contents' database 6 will be indexed to have the same structure (weighted semantic representations (LSC2+FSW2) becoming a global weighted semantic representation (LSCS2+FSWS2)) as that of the global semantic representation (LSCS1+FSWS1) of the query Q.

The said program in second computer means 3 also obtains the best response R for an input query Q on the basis of the global weighted semantic representations (LSCS1+FSWS1 and LSC2S+FSWS2).

Needless to say that, although it is not shown in FIG. 1, contents database 6 can be implemented in a file in a computer fiscally remote with respect to the server 4 and can be accessed, for example, through the Internet or other WAN, LAN or the like.

Computer means 2, 3 can be implemented in a separate respective computer, or can be implemented in the same computer. Even computer means 2, 3 can be implemented in the lexical server 4.

Figure 2:
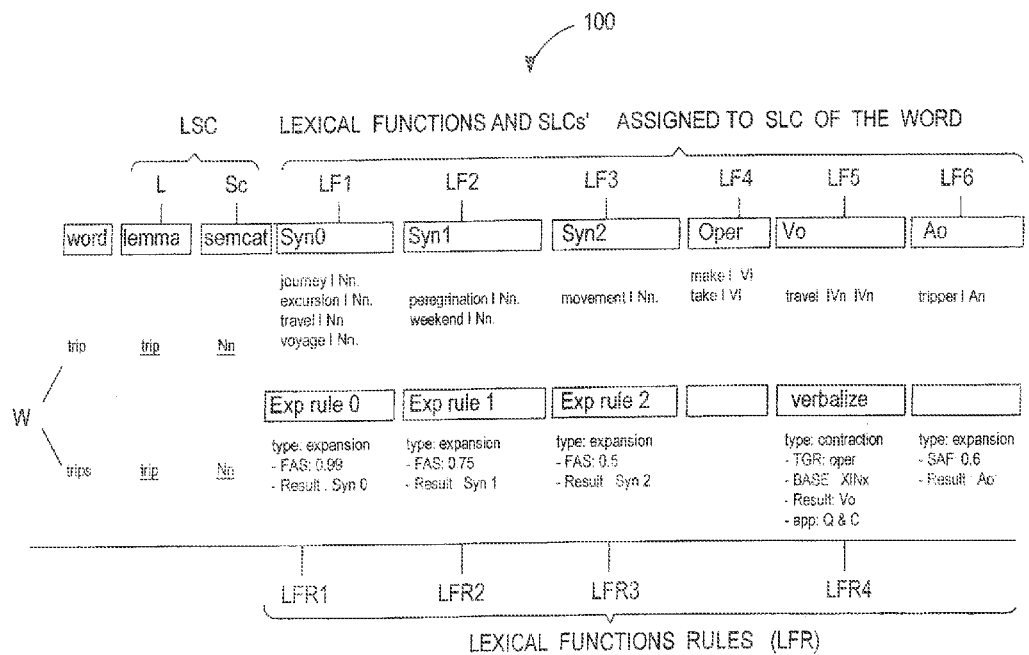
FIG. 2 is a representation of an entry of an example of lexicon and Lexical Functions assignments and rules database according to the present invention.

The lexical server 4 has a lexicon and Lexical Functions assignments and rules (LSCLF) database 5 consisting of a database with multiple registers 100, each composed of several fields, having an entry word; a semantic category of the word, assigned according to how the word would help to detect the main topic or action of the query Q or the content C, and a lemma of the entry word which are combined to formally represent the meaning of the word (LSC); and several related meanings representing other words associated to the meaning of the word through Lexical Functions (LF), comprising at least as synonyms (syn0; syn1; syn2, . . . ); contraries; superlatives; adjectives associated to a noun; and verbs associated a noun. A set of expansion, contraction and transformation rules based on lexical functions associations (LFR) is also predefined in database 5. In FIG. 2, a representation of a entry or register of the lexicon and Lexical Functions assignments and rules (LSCLF) database 5 according to the present invention, corresponding to the words "trip" (singular) and "trips" (plural). The entries are words W. In this case they have a common semantic representation (LSC) consisting of the same lemma L which is "trip", representing both "trip" and "trips", linked to the semantic category SC (SemCat in the representation of the entry), in this case a "normal noun" (Nn).

Following the semantic representation of the meaning of the word (lemma L and semantic category SC (LSC)) different lexical functions (LF), such as synonyms LF1, LF2, LF3; verbs associated to the noun LF4. LF5; adjectives associated to the entry noun LF6, and so on.

Linked to the lexical functions assignments area, a set of expansion and transformation rules based on lexical functions associations (LFR) that may apply to queries (Q) and contents (C) containing that entry, such as: contracting the meaning LSC of the entry and the meanings LSC' associated to its LF5 into the meaning LSC' associated to its LF4 (LFR5), expanding the indexation of the meaning LSC of the entry to its synonyms (meanings LSC' assigned to entry LF1) (LFR1), and so on.

The lexicon and Lexical Functions assignments and rules (LSCLF) database 5 is implemented in a database regularly updatable on a time basis and in function of the particular project.

The contents database 6 can also be linked to a software agent so-called in the field "spider" 8, so that the contents database 6 may be filled automatically by this software agent that collects pages from the websites.

The operation of the search engine is as follows. The semantic search engine returns to the user 10 a response R as the result of a matching process consisting in comparing the natural language query Q with a plurality of contents C, formed of phrases or expressions obtained from a contents database 6, and selecting the response R as being the contents corresponding to the comparison having a best semantic matching degree. The main steps are:

transforming the contents C into a global semantic representation (LSCS2) that gives the full meaning of the content C, by tokenizing the contents C into individual words W2, and transforming individual or groups of words W2 of the contents C into semantic representations consisting of pairs of lemma L plus a semantic category SC (LSC2), retrieved from lexicon and Lexical Functions assignments and rules (LSCLF) database 5.

applying lexical functions rules LFR to the sequence of LSC2 representing the global meaning of the contents C, so called LSCS2, generating different versions of the global semantic representation (LSCS2), of the contents C, and, for LSC2 of each version, expanding its original meaning by adding related meanings (that have been previously associated to it via lexical functions (LF)) and their semantic relation quality (expressed through the Semantic Approximation Factor (FAS)) into the indexation of the content C weighting semantic representations LSC2 in the basis of their category index and their frequency (LSC2+FSW2) generating global weighted semantic representations (LSCS2+FSWS2) of the contents C indexing the global weighted semantic representations (LSCS2+FSWS2) of the contents C into Contents database 6, transforming the query Q into a global semantic representation (LSCS1) that gives the full meaning of the query Q, by tokenizing the query Q into individual words W1, and transforming individual or groups of words W1 of the query Q into semantic representations consisting of pairs of lemma L plus a semantic category SC (LSC1), retrieved from the lexicon and Lexical Functions assignments and rules (LSCLF) database 5.

applying lexical functions rules LFR to the sequence of LSC1 representing the global meaning of the query Q, so called LSCS1, generating different versions of the global semantic representation (LSCS1), of the query Q, weighting semantic representations LSC1 in the basis of their category index and their frequency (LSC1+FSW1) generating global weighted semantic representations (LSCS1+FSWS1) of the query Q, calculating a semantic matching degree in a matching process, between a global weighted semantic representation (LSCS1+FSWS1) of the query Q and a global weighted semantic representation (LSCS2+FSWS2) of the indexed contents C, assigning a score, and, retrieving the contents C which have the best matches (score) between their global weighted semantic representation (LSCS2+FSWS2) and the query Q global weighted semantic representation (LSCS1+FSWS1) from the database 6;

The process is repeated for every contents C in the contents database 6 to be analyzed and the response R is selected as being that having the best score, according to established criteria.

The input query Q is converted "on the fly" and the contents C are converted and indexed in a regular recurrence.

As it will be understood, the semantic search engine of the present invention enhances the possibilities of semantics and of lexical combinations, on the basis of the work carried out by I. Melcuk, within the frame of the Meaning-Text theory (MTT) and combines it with the calculation of an objective semantic weight based on a category index and with an automatic entropy calculation based on statistic frequency of elements, inspired in Claude E. Shannon's Information Theory.

The semantic search engine of the present invention is based on the theoretical principle that languages are defined by the way their elements are combined, is new theory states that it is the proper lexicon that imposes this combination and, therefore, we need to focus on the description of the lexical units and its semantics and not so much on a syntactic description (note that up to this moment, most of the existing Natural Language software bases its analysis on the syntactic structure of the phrases to the detriment of semantics, something which does not allow meaning recognition).

This innovative tool based on the lexicon, allows the detection of phrases with the same meaning, even though they may be formally different. Most of the existing Natural Language software can barely detect these types of semantic similarities, even though they are very common, due to the fact that such software concentrates only on the form and syntax of the phrase. As a result, the Semantic Search Engine of the present invention is able to regroup any questions asked by the user, however different or complex they may be, and find the appropriate information and response.

Indeed, Lexical Functions LF (LF1, ... LF6, ...) are a tool specially designed to formally represent relations between lexical units, where what is calculated is the contributed value and not the sum of the meaning of each element, since a sum might bring about an error in an automatic text analysis. The matching process is based in this principle not to sum up meanings but calculating contributed values to the whole meaning of the query Q and each of the contents C (or each candidate to be a result)

Lexical Functions, therefore, allow us to formalize and describe in a relatively simple manner the complex lexical relationship network that languages present and assign a corresponding semantic weight to each element in the phrase. Most importantly, however, they allow us to relate analogous meanings no matter which form they are presented in.

Indeed, natural languages are more restrictive than they may seem at first glance. Consequently, in the majority of the cases, we encounter fixed expressions sooner or later. Although these have varying degrees of rigidity, ultimately they are fixed, and must be described according to this characteristic, for example:

Obtain a result

Do a favour

Ask a question

Raise a building

All of these examples show us that it is the lexicon that imposes selection restrictions since we would hardly find "do a question" or "raise a favour" in a text.

Actually, the most important factor when analyzing these phrases is that, from the meaning point of view, the elements do not have the same semantic value. As shown in the examples provided before, the first element hardly provides any information, but all of the meaning or semantic weight is provided by the second element.

The crucial matter here is that the semantic relationship between the first and second element is exactly the same in every example. Roughly, what we are saying is "make X" (a result, a joke, a favour, a question, a building). This type of relation can be represented by the "Oper" lexical function (LF4 in FIG. 2).

"Syn0" (lexical function LF1), "syn1" (lexical function LF2), "syn ... n" for synonyms at a distance n (see FIG. 1); "cont" for contrary, "super" for superlatives, are all examples of lexical functions. Lexical Functions are used to define semantic connections between elements and provide meaning expansion (synonyms, hyperonyms, hyponyms ...) or meaning transformation (merging sequences of elements into a unique meaning or assigning semantic weight to each element).

Figure 3:
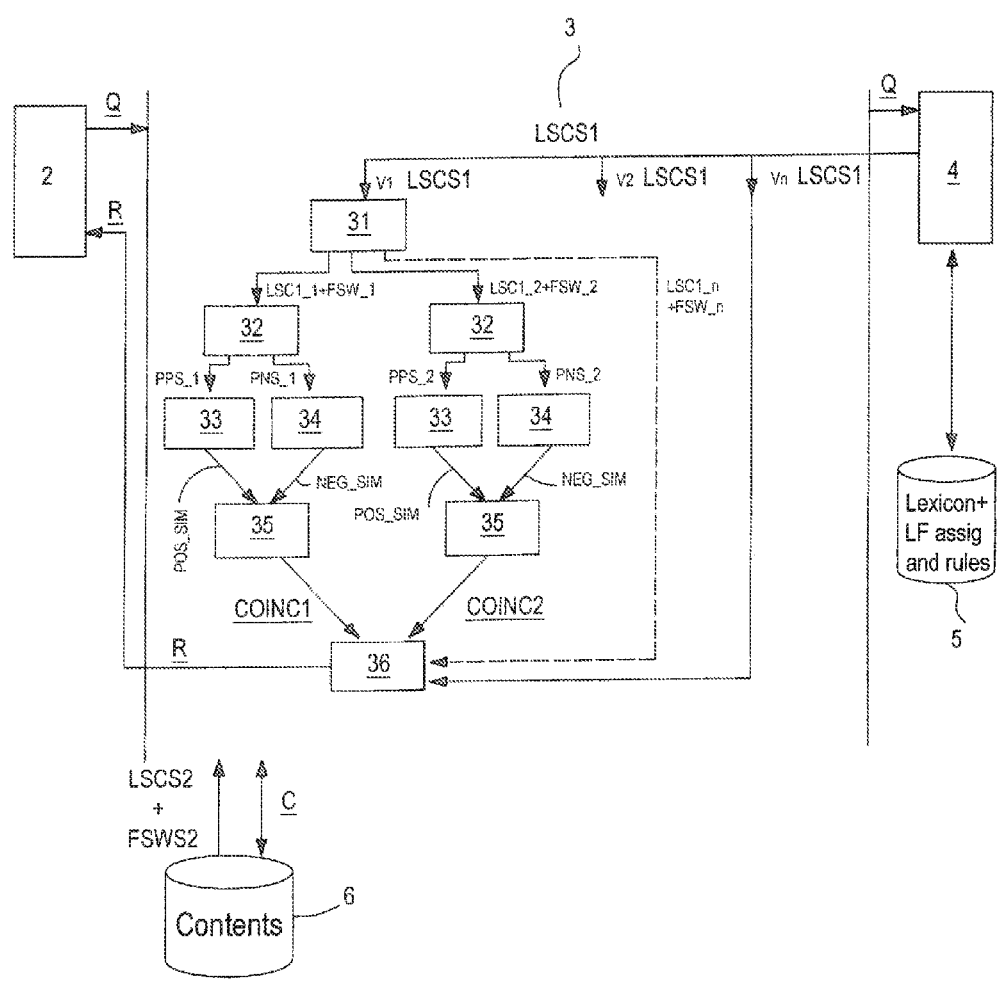
FIG. 3 is a block diagram illustrating the workflow or algorithm of the semantic weight assignation and balancing, matching and decision making process, according to the preferred embodiment of the present invention.

Turning back to the matching process of aforesaid step 5, the same is performed through a scored coincidence algorithm, which is illustrated in FIG. 3, it will be better understood after the short explanation that follows of the indexation process of the database 6 contents.

The "content knowledge" of the database 6 is to be understood as the sum of values from each content C, The number, attributes and functionalities of these contents C are predefined for every single project and they characterize the way in which every content C will be indexed. Every content C has different attributes related to the indexation and score process:

Linguistic Type: defines the kind of data that the content C must contain and the way to calculate the coincidence between the query Q and the content C.

Negative weight factor: defines how the elements present in content C that do not match with the query Q will affect to the score Meaning expansion through Lexical functions: defines the lexical functions that will be taken into account when indexing a semantic representation (LSC2) for that content C in order to expand its original meaning to others (LSC2') that have been previously related to it via lexical functions (LF).

Rel: Factor (from 1 to 0) that represents the reliability of the nature of the matching for that content in particular (this factor points, for example, the difference between finding a match in the title of the content and finding a match in the body of the content).

Once the contents C are defined, they may be filled with natural language phrases or expressions for in order to get a robust content knowledge. This process can be automatic (through the spider 8) or manual. The indexation of the contents C comprises the storage of the linguistic type, the Meaning expansion through Lexical functions, the REL factor and the global weighted semantic representation (LSCS2+FSWS2) of its natural language phrases or expressions and the semantic approximation factor (SAF) of each indexed LSC2.

The indexation of the global weighted semantic representation (LSCS2+FSWS2) comprises a semantic weight calculated for each semantic representation (LSC2) in computer 3:

for each semantic representations (LSC2) of the global semantic representation of the contents C (LSCS2), assigning a category index (ISC) that is proportional to semantic category (SC) importance, normalizing the category index assignation to get a semantic weight based on category (SWC) to make sure that all category indexes (ISC) for a global semantic representation of the contents C (LSCS2) add exactly one, by dividing its category index (ISC) by the sum of category indexes of all semantic representation (LSC2) of the global semantic representation of the contents C (LSCS2)

assigning a frequency index (FREQ) to each semantic representation (LSC2) through a precalculated meaning-frequency table, where each meaning (LSC2) present in the indexed contents C has a computed frequency (FREQ) that takes into account the number of times that it appears in different contents C and the Semantic Approximation Factor (SAF) that defines the quality of each appearance (Considering the SAF of a LSC2 appearing as itself=1, maximum quality of the appearance). The frequency index application is based on the theory that Information decreases as probability of a meaning increases, based on a logarithmic proportion.

calculating and normalizing a frequency balanced semantic weight (FSW) by dividing the SWC by 1+log 2 of the meaning-frequency value (FREQ) for each meaning LSC2 of the global semantic representation (LSCS2) in contents C and normalizing them in order that all FSW of the global semantic representation of the contents C (LSCS2) add 1.

The indexation of each LSC2 in each content C also stores the semantic approximation factor (SAF) that defines the quality of the appearance of the LSC2 in a particular content C. The assignation of the semantic approximation factor (SAF) to each appearance of each semantic representation (LSC2) is done in computer 3. A semantic representation (LSC2) appearing as itself store a SAF=1. A semantic representation (LSC2') that will be indexed as a result of the paradigmatic expansion of the original LSC2 present in content C will store the SAF indicated by the lexical function rule (LFR) applied to expand the meaning of the original LSC2 present in content C.

As said, each content C has a Meaning expansion through Lexical functions rules attribute that allows to expand each semantic representation (LSC2) of the global semantic representation of the contents C (LSCS2) to other related meanings present in each LSC2 lexical functions assignments. For each Lexical Function rule (LFR) selected, all related meanings to each semantic representation (LSC2) of the global semantic representation of the contents C (LSCS2) that are defined in the LFR will also be indexed. Lexical Functions rules (LFR) resulting in a paradigmatic expansion of a meaning (LSC2') link to the meanings assigned to a certain lexical function and to the semantic approximation factor (SAF) assigned to that lexical function.

Linguistic type and a REL factor attributes associated to a content C are stored with the indexed global weighted semantic representation (LSCS2+FSWS2) of the natural language phrases or expressions. Content C linguistic type, REL and global weighted semantic representation (LSCS2+FSWS2) are stored into memory to provide faster responses.

As to the calculation of the said semantic matching degree in a matching process, a said Scored Coincidence Algorithm is used by the computer 3 to find the best matches between the input and the content knowledge on contents database 6: searches and calculates the semantic coincidence between the query Q and the contents C in order to get a list of scored matches. It subsequently values the formal similarity between these matches to get a list of completed scored matches An example of such an Scored Coincidence Algorithm is shown in FIG. 3.

After the said sequence of semantic representations (LSC1) that gives a global semantic representation of the query Q (LSCS1) retrieved by lexical server 4, and having stored in contents database 6 the contents C indexation (comprising the global weighted semantic representation (LSCS2+FSWS2), the semantic approximation factor (SAF) for each LSC2, the linguistic type and the REL factor) the matching process will start weighting the query semantic representations LSC1 in the basis of their category index and their frequency (LSC1+FSW1) generating global weighted semantic representations (LSCS1+FSWS1) of the query Q, in order to get an structure like the ones stored in the indexation of Contents C. The semantic coincidence algorithm starts the matching process trying to match the global weighted semantic representation of the query Q (LSCS1+FSWS1) with the global weighted semantic representation (LSCS2+FSWS2) of the contents C and will get a final coincidence score for each matched content C. All this process is performed by the following semantic coincidence algorithm, in the computer 3:

For each semantic representation (LSC1) of the global semantic representation of the query Q (LSCS1) retrieved by lexical server 4, assigning a category index (ISC) that is proportional to semantic category (SC) importance, normalizing the category index assignation to get a semantic weight based on category (SWC1) to make sure that all category indexes (ISC) for a global semantic representation of the query Q (LSCS1) add exactly one, by dividing its category index (ISC) by the sum of category indexes of all semantic representation (LSC1) of the global semantic representation of the query Q (LSCS1)

assigning a frequency index (FREQ) to each semantic representation (LSC1) through a precalculated meaning-frequency table.

calculating and normalizing a frequency balanced semantic weight (FSW1) by dividing the SWC1 by 1+log 2 of the meaning-frequency value (FREQ) for each meaning LSC1 of the global semantic representation (LSCS1) in query Q and normalizing them in order that all FSW1 of the global semantic representation of the query Q (LSCS1) add 1.

The process is run for every single semantic representation (LSC1) of the global semantic representation of the query Q (LSCS1) and performed in block 31 of FIG. 3, Then, for each weighted semantic representation (LSC1+FSW1) of the global weighted semantic representation of the query Q (LSCS1+FSWS1), if its lemma (L) and semantic category (SC) combination (LSC1) matches a semantic representation (LSC2) of the global weighted semantic representation of the contents C (LSCS2+FSWS2), or a semantic representation (LSC2') assigned to the semantic representation (LSC2) of the global semantic representation of the contents C (LSCS2+FSWS2), through a lexical function (LF1, LF2, LF3, . . . ) in a register 100 of the lexicon and Lexical Functions assignments and rules (LSCLF) (5), then calculate in block 32, a partial positive similarity as PPS=FSW1×SAF, being SAF a Semantic Approximation Factor varying between 0 and 1, accounting for the semantic distance between LSC1 and the LSC2 or the LSC2's Lexical functions assignment (LSC2') matched. SAF allows to point the difference between matching the same meaning (LSC1=LSC2 where SAF=1) or matching a meaning related to the original LSC2 present in contents C through a lexical function assignment (LSC1=LSC2's Lfn assignment where SAF=factor attached to the used Lexical Function rule (LFR) that expands the original meaning). In FIG. 3, two PPS outputs from block 32 are shown (PPS1 and PPS2), and if the semantic representation (LSC1) doesn't match any semantic representation (LSC2) of the global weighted semantic representation of the contents C (LSCS2+FSWS2), or a semantic representation (LSC2') assigned to the semantic representation (LSC2) of the global semantic representation of the contents C (LSCS2+FSWS2), through a lexical function (LF1, LF2, LF3, . . . ) then calculate a partial positive similarity as PPS=0.

After that, in block 33 a Total Positive Similarity (POS_SIM) is calculated as the sum of all the aforesaid partial positives similarities (PPS) of the global weighted semantic representation (LSCS1+FSWS1) of the query (Q).

Subsequently, for every semantic representation (LSC2) of the global semantic representation of the contents C (LSCS2) that did not contribute to the total Positive Similarity (POS_SIM), then calculate in block 32 a partial negative similarity as PNS=frequency balanced semantic weight (FSW2) of the LSC2 with no correspondence in LSCS1.

A Total Negative Similarity (NEG_SIM) is calculated in block 34 as the sum of all the aforesaid partial negative similarities (PNS) of the global weighted semantic representation (LSCS2+FSW2)×Negative weight factor of the contents (C).

In block 35, a semantic coincidence score (COINC1; COINC2) is calculated in a way that depends on the linguistic type of the content (C). For linguistic type=phrase a semantic coincidence score (COINC1; COINC2) is calculated as the difference between the Total Positive Similarity (POS_SIM) and Total Negative Similarity (NEG_SIM). For linguistic type=freetext a semantic coincidence score (COINC1; COINC2) is calculated by taking the same value than the Total Positive Similarity (POS_SIM).

In block 36, the semantic matching degree between the query Q and a content C is calculated for each coincidence (COINC1; COINC2) between the global weighted semantic representation of the query Q (LSCS1+FSWS1) and the global weighted semantic representation of the content C (LSCS2+FSWS2), as the coincidence (COINC1; COINC2) for the REL factor (reliability of the matching) of content C. Actually, in block 36 a different decision making process can be performed, other than the one explained.

The response (R) to the query ((J) is selected as the contents (C) having the higher semantic matching degree, response (R) is outputted from computer means 3 to computer means 2, as it is shown in FIGS. 1 and 3.

As it can be seen, the score of the semantic matching degree of each match will be represented by a number between 0 (no coincidence found between query and content knowledge) and 1 (perfect match between query and content knowledge). All the scores within this range show an objective proportion of fitting between the query and the content.

The way in which this objectiveness is embodied into the final output varies depending on the projects. Every single project has its expectation level: which quality should the results have and how many of them should be part of the output. This desirable expected output can be shaped by applying the "static settings" on the computer means 3 and the "maximum number of results" on the computer means 2.

The invention claimed is:

1. A method for performing a semantic matching process, the method, with at least one computing device, comprising:
   detecting one or more meanings of a query,
   comparing the one or more meanings with one or more detected meanings of one or more pieces of content, and
   outputting at least one response of the comparing;
   wherein detecting one or more meanings of the query further comprises:
      detecting and formalizing all meanings of the query into a global semantic representation, wherein the global semantic representation gives a full meaning of the query by transforming individual or groups of words of the query into semantic representations comprising pairs of lemma and a semantic category retrieved from a lexicon and lexical functions assignments and rules database, and
      weighting the semantic representations in a basis of their category index and their frequency to generate a global weighted semantic representation of the query;
   wherein detecting one or more meanings of the one or more pieces of content further comprises:
      detecting and formalizing one or more meanings of the one or more pieces of content into a global semantic representation, wherein the global semantic representation gives a full meaning of the one or more pieces of content by transforming individual or groups of words of the one or more pieces of content into semantic representations comprising of pairs of lemma and a semantic category retrieved from the lexicon and lexical functions assignments and rules database; and
      weighting the semantic representations in a basis of their category index and their frequency to generate a global weighted semantic representation of the one or more pieces of content;
   wherein the comparing further comprises:
      calculating a semantic matching degree and assigning a score between the global weighted semantic representation of the query and the global weighted semantic representation of the one or more pieces of content, and retrieving at least one piece of content of the one or more pieces of content based on the at least one piece of content having the best assigned score and output the retrieved at least one piece of content as the response;

wherein the one or more pieces of content are formed of phrases or expressions obtained from a contents database.

2. The method of claim 1, wherein the detecting and formalizing all meanings of the query includes applying one or more lexical functions rules to change or contract the pairs of lemma and the semantic category retrieved from the lexicon in the lexicon and lexical functions assignments and rules database to generate one or more different versions of the global semantic representation of the query.

3. The method of claim 1, wherein the step of detecting and formalizing all the meanings of the one or more pieces of content includes applying lexical to the sequence representing the one or more pieces of content global meaning to transform, contract, or expand the pairs of lemma and the semantic category retrieved from the lexicon in the lexicon and lexical functions assignments and rules database.

4. The method of claim 1, further comprising, prior to calculating the semantic matching degree:

indexing, for each global weighted semantic representation, each single semantic representation, its frequency balanced semantic weight, its semantic approximation factor, and all its expansions allowed by the lexical functions rules, and for each expansion, its semantic approximation factor, of the one or more pieces of content in the contents database.

5. The method of claim 1, wherein the transformations of individual or groups of tokenized words of the query and the one or more pieces of content in semantic representations are performed by applying the rules of Meaning Text Theory and Lexical Functions rules and assignments, wherein the semantic representations comprise each of a couple formed of a lemma and a semantic category.

6. The method of claim 1, wherein the lexicon and lexical functions assignments and rules database comprises:

a database having multiple registers, each register comprising one or more fields, wherein each field comprises an entry word, a semantic category, and a lemma;

wherein the entries of each field are combined to represent the meaning of the entry word one or more other meanings of the entry word, contraries, superlatives, adjectives, and verbs; and wherein the one or more other meanings are determined through lexical functions comprising one or more synonyms.

7. The method of claim 1, wherein the lexicon and lexical functions assignments and rules database is regularly updated on a time-basis or on a project-basis.

8. The method of claim 1, wherein the matching process between the query and the one or more pieces of content comprises:

for each semantic representation of the global semantic representation of the query:

assigning a category index that is proportional to importance of the semantic category;

normalizing the category index assignment to determine a semantic weight based on category wherein all category indexes for the global semantic representation of the query equal 1, and dividing the category index by the sum of category indexes of all semantic representation of the global semantic representation of the query;

assigning a frequency index to each semantic representation through a precalculated meaning-frequency table; and calculating and normalizing a frequency balanced semantic weight by dividing the category by a log function of the meaning-frequency value for each meaning of the global semantic representation in the query and normalizing them in order that all frequencies of the global semantic representation of the query add up to 1;

for each of the semantic representations of the global semantic representation of the one or more pieces of content:

assigning a category index that is proportional to importance of the semantic category;

normalizing the category index to determine a semantic weight based on category wherein all category indexes for a global semantic representation of the one or more pieces of content add up to 1, and dividing the category index by the sum of category indexes of all semantic representations of the global semantic representation of the one or more pieces of content;

assigning a frequency index to each semantic representation through a precalculated meaning-frequency table, wherein each meaning has a computed frequency that represents the number of times it appears in different pieces of content and a semantic approximation factor that defines the quality of each appearance using a frequency index application, wherein the frequency index application is based on that as information decreases as probability of a meaning increases, based on a logarithmic proportion; and calculating and normalizing a frequency balanced semantic weight by dividing the category by a log function of the meaning-frequency value for each meaning of the global semantic representation of the one or more pieces of content and normalizing them in order that all the frequency balanced semantic weights of the global semantic representation of the one or more pieces of content add up to 1.

9. The method of claim 1, wherein, for each semantic representation of the global semantic representation of the query:

if its lemma and semantic category combination match a semantic representation of the global weighted semantic representation of the one or more pieces of content or a semantic representation assigned to the semantic representation of the global semantic representation of the one or more pieces of content through a lexical function in a register of the lexicon and lexical functions assignments and rules, then calculate a partial positive similarity factor between 0 and 1, accounting for a semantic distance between each semantic representation and the semantic representation of the global semantic representation of the one or more pieces of content; and if the semantic representation does not match any semantic representation of the global weighted semantic representation of the one or more pieces of content, then calculate a partial positive similarity factor as 0.

10. The method of claim 9, wherein a total positive similarity is calculated as the sum of all partial positive similarities of the global weighted semantic representation of the query.

11. The method of claim 10, wherein, for every semantic representation of the global weighted semantic representation of the one or more pieces of content not contributing to the total positive similarity, calculate a partial negative similarity as a frequency balanced semantic weight of the semantic representation of the global weighted semantic representation of the one or more pieces of content with no correspondence with any semantic representation in the global weighted semantic representations of the query.

12. The method of claim 11, wherein a total negative similarity is calculated as the sum of all partial negative similarities of the global weighted semantic representation of the one or more pieces content.

13. The method of claim 12, wherein for each of the one or more pieces of content, calculate a coincidence score as the difference between the total positive similarity and the total negative similarity when the linguistic type for the one or more pieces of content is a phrase;

wherein the total positive similarity value is the coincidence score when the linguistic type for the one or more pieces of content is free text.

14. The method of claim 13, wherein a semantic matching degree is determined based on the query and the one or more pieces of content for each coincidence between the global weighted semantic representation of the query and the global semantic representation of the one or more pieces of content as the coincidence for the reliability of matching of the one or more pieces of content.

15. The method of claim 14, wherein the response to the query is selected as the one or more pieces of content having a highest semantic matching degree.

* * * * *